(12) United States Patent
Navaratnam et al.

(10) Patent No.: US 7,590,392 B2
(45) Date of Patent: Sep. 15, 2009

(54) TRANSMITTER COMPENSATION

(75) Inventors: Navindra Navaratnam, Perak (MY); Aninda K. Roy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 11/263,791

(22) Filed: Oct. 31, 2005

(65) Prior Publication Data

US 2007/0099572 A1    May 3, 2007

(51) Int. Cl.
H04B 1/04 (2006.01)
H04B 17/00 (2006.01)
H03K 17/16 (2006.01)
G06G 7/12 (2006.01)

(52) U.S. Cl. .............. 455/103; 455/115.1; 455/67.11; 455/501; 326/21; 326/31; 327/362

(58) Field of Classification Search .............. 455/114.3, 455/115.1, 124, 127.1, 114.2, 67.11, 295, 455/103, 120, 126, 68, 500, 501; 327/538, 327/541, 513, 334, 362, 376, 382; 326/30, 326/31, 32, 33, 34
See application file for complete search history.

(56) References Cited

U.S. PATENT DOCUMENTS

| | | | | |
|---|---|---|---|---|
| 5,134,398 A | * | 7/1992 | Yasutake et al. | 341/119 |
| 5,710,653 A | * | 1/1998 | Nemecek et al. | 398/194 |
| 6,154,083 A | * | 11/2000 | Gaudet et al. | 327/312 |
| 6,356,105 B1 | | 3/2002 | Volk | |
| 6,380,758 B1 | | 4/2002 | Hsu et al. | |
| 6,445,316 B1 | | 9/2002 | Hsu et al. | |
| 6,624,655 B2 | * | 9/2003 | Mandal et al. | 326/30 |
| 6,693,450 B1 | | 2/2004 | Volk et al. | |
| 6,965,529 B2 | | 11/2005 | Zumkehr et al. | |
| 7,020,818 B2 | | 3/2006 | Dour et al. | |
| 7,064,602 B2 | * | 6/2006 | Nguyen | 327/541 |
| 7,133,644 B2 | * | 11/2006 | Demir et al. | 455/67.11 |
| 7,292,102 B2 | * | 11/2007 | Lee et al. | 330/254 |
| 7,415,286 B2 | * | 8/2008 | Behzad | 455/553.1 |
| 2004/0037346 A1 | * | 2/2004 | Rusu et al. | 374/121 |
| 2004/0124850 A1 | | 7/2004 | Koneru | |
| 2004/0177301 A1 | * | 9/2004 | Tarango et al. | 714/738 |
| 2004/0243857 A1 | * | 12/2004 | Watnik et al. | 713/300 |
| 2004/0263203 A1 | | 12/2004 | Lattes | |
| 2007/0018713 A1 | * | 1/2007 | Tripathi et al. | 327/512 |

* cited by examiner

Primary Examiner—Duc M Nguyen
(74) Attorney, Agent, or Firm—Erik R. Nordstrom

(57) ABSTRACT

In some embodiments, a chip with a transmitter having a transmitter driver is provided. Also provided is a general compensation circuit coupled to the transmitter to generally compensate the transmitter driver and a specific compensation circuit coupled to the transmitter driver to specifically compensate the transmitter driver. Other embodiments are disclosed and claimed herein.

17 Claims, 3 Drawing Sheets

TRANSMITTER COMPENSATION

BACKGROUND

Chip-to-chip communication is commonly implemented with high-speed, point-to-point links such as with differential point-to-point links transmitting differential data signals. Achievable data rates can be affected by voltage and timing margins of the transmitted signals. For example, deviations from specified transmitted voltage swings during operation can result in decreased margins and therefore a decreased data-rate. Unfortunately, it is difficult to control voltage swing levels because they vary with operating environment changes such as with changes in PVT (process, voltage, and temperature). Because PVT changes generally affect the various transmitter circuits within a chip the same, chips typically incorporate one or more distributed general compensation circuits to control multiple transmitter circuits reasonably proximal to the compensation circuit to compensate for such PVT variations. Such compensation circuits include driver current compensation (ICOMP) and termination resistor compensation (RCOMP) circuits to control (e.g., keep reasonably constant) drive currents and termination resistances in accordance with design specifications.

Unfortunately, however, within-die systematic and random process variations between the compensation circuits and the transmitter circuits they service, as well as between the transmitter circuit instances themselves, can undue some of the compensation achieved by the general compensation circuits. Thus, using such compensation circuits can still result in errors in the transmitter output voltage swing and thereby decrease the voltage margin available at the receiver decreasing achievable data rates.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
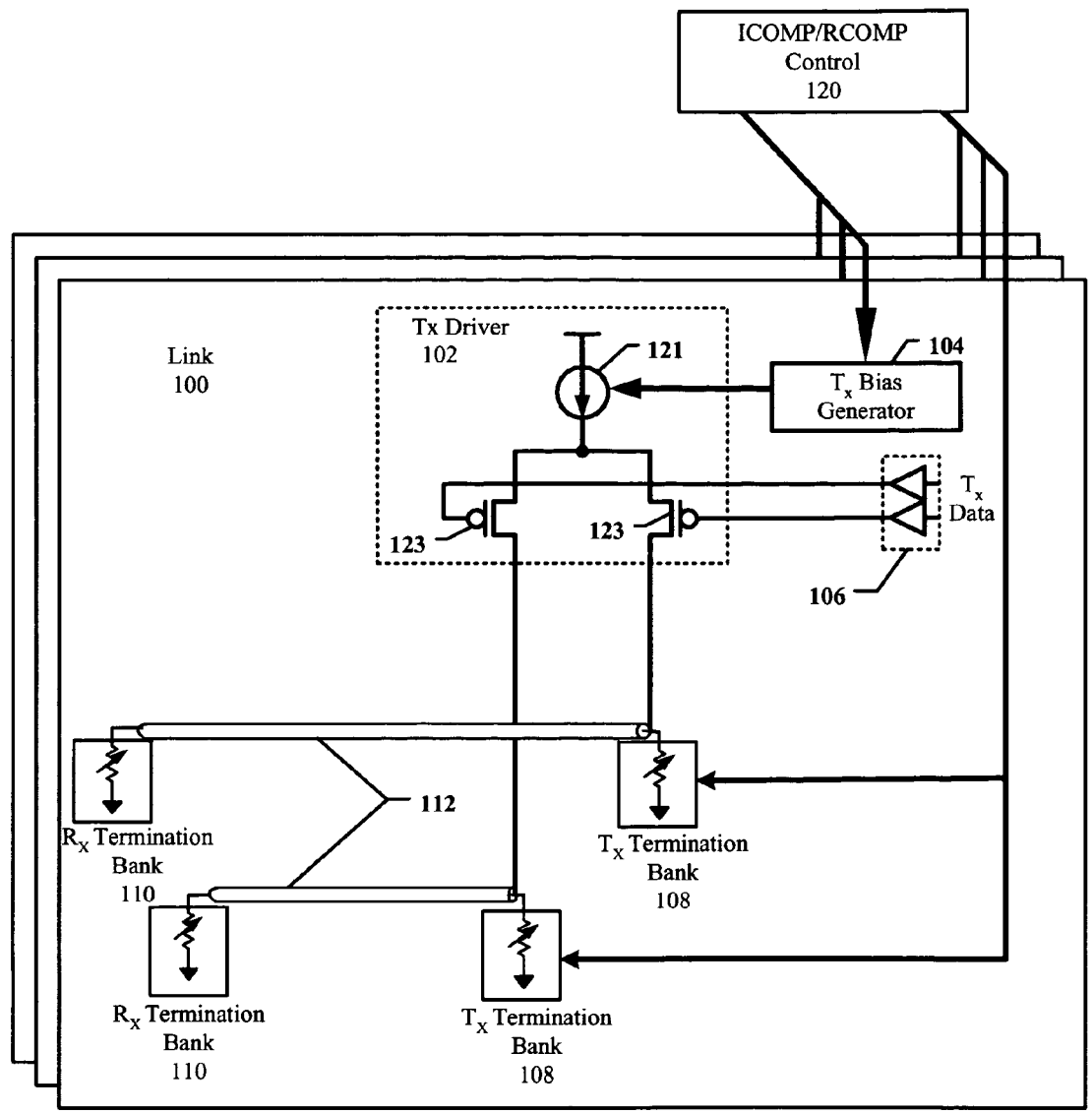
FIG. 1 is a schematic diagram of multiple point-to-point links with general transmitter driver compensation.

FIG. 1 shows differential high speed serial links 100 with general transmitter-side current and resistive compensation via ICOMP/RCOMP Control circuit 120. Each link 100 generally comprises a transmitter coupled to a receiver (e.g., on a separate chip) over a differential channel 112. In relevant part, each transmitter comprises a transmitter driver 102 coupled to transmitter termination resistance banks 108 to transmit a differential signal to corresponding receiver termination banks 110. In the depicted embodiment, each transmitter driver 102 generally comprises a current source 121 and differentially coupled input transistors 123 forming a differential driver circuit to generate the differential voltage signal at the termination resistance bank 108. (Note that in some embodiments, a transmitter driver may comprise additional driver circuits coupled together to provide different achievable signal strengths. Thus, as used herein, the term "transmitter driver" encompasses one or more actual driver circuits coupled together to generate a signal. Similarly, a simple differential pair driver circuit is shown, but other suitable driver circuits are within the scope of this disclosure.)

Each transmitter driver 102 is also coupled to a pre-driver 106 and to a bias generator 104. The pre-driver 106 provides its associated transmitter driver 102 with a differential bit signal to be transmitted, and the bias generator 104 controls the strength of its associated driver section 102.

The ICOMP/RCOMP control circuit provides a general compensating solution comprising a centrally located (relative to links 100) ICOMP circuit and RCOMP circuit. (the term "general" is used to refer to a compensating circuit servicing two or more transmitter circuits to provide them with general compensation.) The ICOMP circuit generates a compensating bias current for each transmitter bias generator 104. The bias generator 104, based on the received ICOMP current, controls its associated driver 102 to generate an output current that drives an output voltage swing meeting specifications across PVT. Similarly, the RCOMP circuit controls the transmitter termination banks 108 to be at impedances in accordance with specifications across PVT. (It should be appreciated that in some embodiments, both ICOMP and RCOMP may not be employed.)

ICOMP and RCOMP circuits are well known and any suitable implementations may be used. For example, in some embodiments, the ICOMP circuit compensation may be performed by using an external precision (e.g., 25 ohm) resistor coupled to a replica of a transmitter driver 102. The current in the replica circuit is adjusted until the voltage drop across the precision resistor is as desired (e.g., 500 mV for a 20 mA driver). The voltage on the output of the precision resistor is compared to reference voltage. If the output voltage is too low (not enough source current), the ICOMP current to the transmitter bias generators is increased, which is reflected in the driver output currents as controlled by the bias generators.

After the ICOMP circuit is in steady-state, the RCOMP circuit starts operation. The RCOMP circuit also utilizes a replica of a transmitter driver. In addition, it uses the ICOMP compensated bias current and is thus additionally compensated for PVT variations. The replica transmitter line driver drives against a selectably engageable, parallel combination of replica transmitter termination circuits. The voltage at the junction of the replica driver and the replica termination circuits is compared against a voltage reference. Based on the comparison, a logic state machine adjusts (i.e. turns on or off) a combination of legs in the replica resistor bank circuit to produce the desired output voltage. The digital code used to enable the replica resistor bank is then shipped to all the transmitter termination banks 108 to set their impedances.

Unfortunately, the actual transmitter drivers 102 and termination banks 108 using the ICOMP current and RCOMP digital codes can reside, for example, thousands of microns away from the general compensation blocks. This can cause systematic mismatch between the replica circuits in the compensation circuits and the actual transmitters and termination banks. Such mismatch may undue some of the compensation resulting in finite static errors in the transmitter output voltage swings during operation. In addition, random process variation between the transmitter circuits and termination circuits can also cause inaccuracies due to the general compensation results not specifically applying to the individually controlled transmitter and termination circuits. Accordingly, with some approaches disclosed herein, specific compensation (e.g., current compensation) may also be provided to individual transmitters to further compensate for specific deviations.

Figure 2:
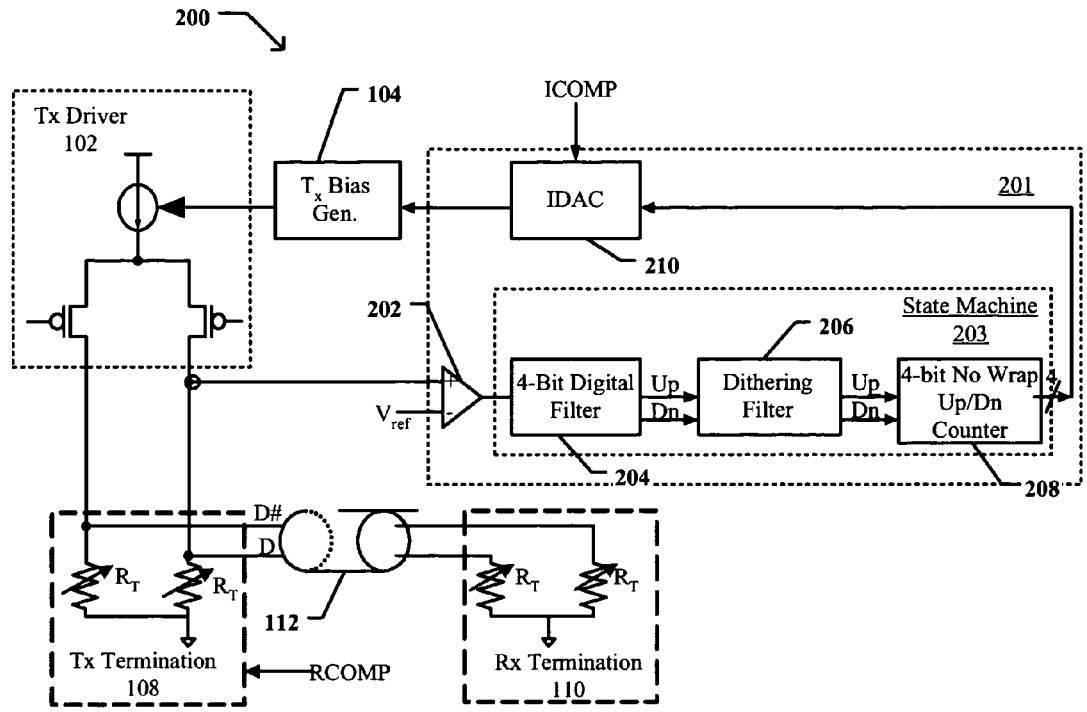
FIG. 2 is a schematic diagram of a point-to-point link with specific and general transmitter driver compensation according to some embodiments.

FIG. 2 shows a link 200 with specific current compensation in accordance with some embodiments. Link 200 generally comprises a link 100 coupled to a specific current compensation circuit 201. The specific current compensation circuit 201 comprises a low-offset comparator 202, state machine 203, and a current mode digital-to-analog converter (IDAC) 210 coupled together and to the transmitter-side of the link as shown. During a calibration phase (e.g., at start-up or some other time), the comparator 202 compares the DC voltage at the termination bank 108 against a reference voltage and provides at its output a High or a Low signal based on the comparison. This value is filtered and averaged at the state machine 203, which in the depicted embodiment comprises a digital filter 204, dithering filter 206, and up/down counter 208. The output is a 4-bit digital signal inversely corresponding to the error between the reference level and monitored termination bank voltage. This error signal is provided to the IDAC 210 as specific current compensation information. At the IDAC 210, it is combined with the general compensation (e.g., ICOMP) current to produce a refined compensation signal to bias generator 104 for controlling its transmitter driver 102.

In some embodiments, the nominal values of the control bits from the counter are set at '1000 to realize a bidirectional trimming effect of the ICOMP bias current. In addition, the correction range of the I-DAC 210 may be determined by the maximum possible finite error that can be contributed by variation. This can be addressed, for example, with statistical yield analysis and/or Monte-Carlo simulations modeling various sources of correlated and uncorrelated variation factors. The resolution of the error correction can also be increased by adding additional tunable bits available in the IDAC 210.

In some embodiments, the specific compensation circuit may use circuitry that is already present in the transmitter circuit, e.g., due to other operation reasons. For example, the low offset comparator 202 may already be present, e.g., in a transmitter link detect/squelch sub-circuit. Thus, the additional required hardware may be limited to the filter/averaging unit (finite state machine 203) and an IDAC.

Figure 3:
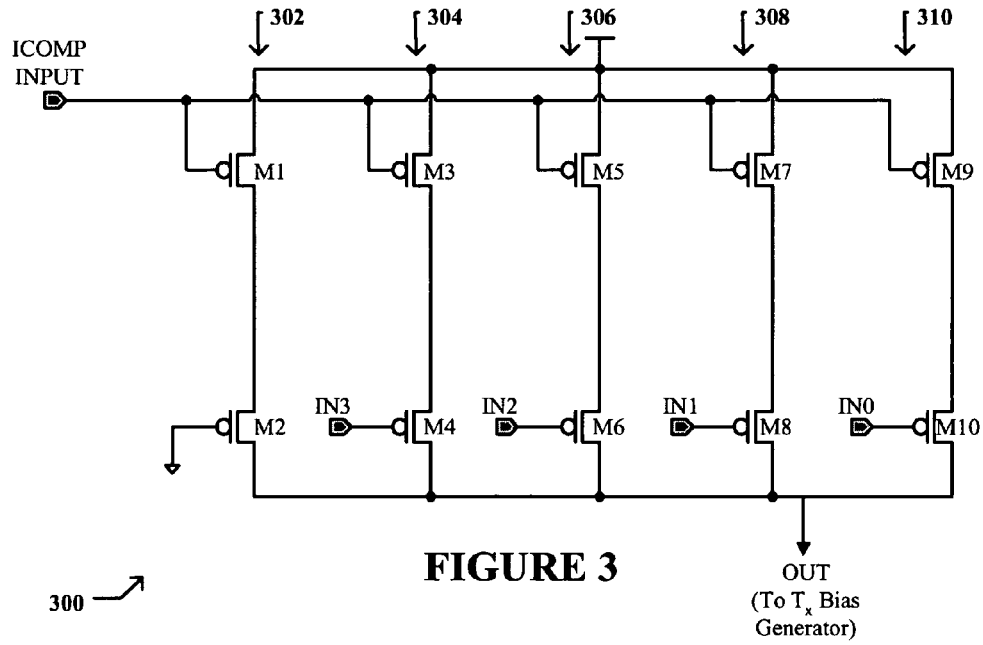
FIG. 3 is a schematic diagram of a current mode digital to analog converter according to some embodiments.

FIG. 3 shows a 4-bit, binary weighted, IDAC 300 suitable for use as the IDAC 210 in the circuit of FIG. 2. This IDAC implementation provides improved output resistance in low voltage environments, e.g., with submicron processes. It generally comprises an anchor leg 302 (current source M1, bias transistor M2), a first (most significant) current leg 304 (current source M3, input transistor M4), a second input leg 306 (current source M5, input transistor M6), a third input leg 308 (current source M7, input transistor M8), and a fourth (least significant) input leg 310 (current source M9, input transistor M10). It has an ICOMP input to receive the ICOMP current signal and bit inputs (IN0 to IN3) to receive the digital error signal from the state machine filter/averaging unit 203. It also has an output (OUT) to be coupled to the bias generator for its associated link transmitter to provide it with a specific compensation control signal based on the general ICOMP signal and specific error signal. The IDAC essentially adds the D-to-A current defined by the digital input (IN0 to IN3) with the general (ICOMP) compensation current signal to produce the overall compensation signal (OUT) to be provided to the transmitter bias generator.

Figure 4:
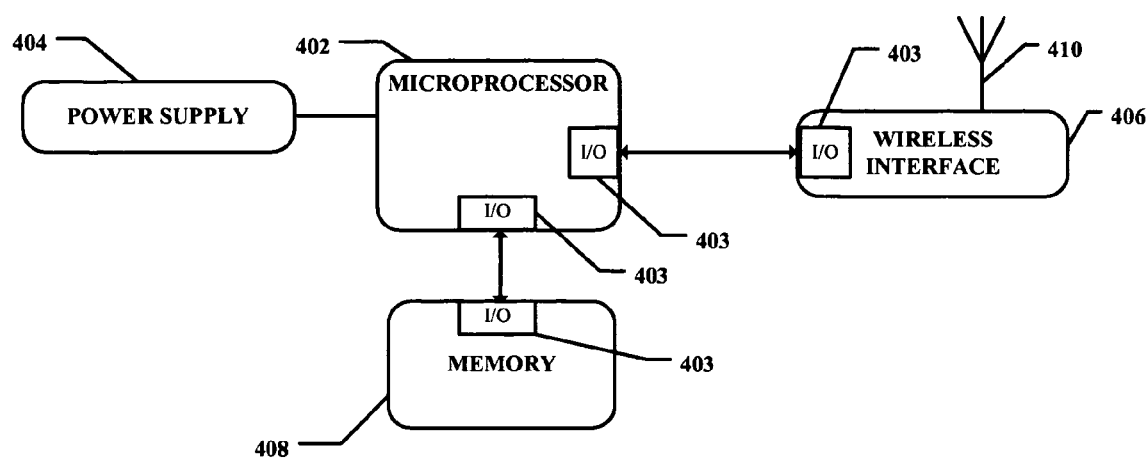
FIG. 4 is a block diagram of a computer system with at least one point-to-point link with specific transmitter driver compensation in accordance with some embodiments.

With reference to FIG. 4, one example of a computer system is shown. The depicted system generally comprises a processor 402 that is coupled to a power supply 404, a wireless interface 406, and memory 408. It is coupled to the power supply 404 to receive from it power when in operation. It is coupled to the wireless interface 406 and to the memory 408 with separate point-to-point links formed from I/O modules 403 to communicate with the respective components. In the depicted diagram, each I/O module 403 comprises a bank (e.g., 20) of transmitters and receivers differentially linked to corresponding receivers and transmitter banks, respectively, in the depicted linked I/O modules. Each transmitter bank is current compensated with a common, general ICOMP circuit and a specific current compensating circuit for each transmitter in accordance with some embodiments disclosed herein. The wireless interface 406 is coupled to an antenna 410 to communicatively link the processor through the wireless interface chip 406 to a wireless network (not shown).

It should be noted that the depicted system could be implemented in different forms. That is, it could be implemented in a single chip module, a circuit board, or a chassis having multiple circuit boards. Similarly, it could constitute one or more complete computers or alternatively, it could constitute a component useful within a computing system.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

Moreover, it should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
   a bank of transmitters each having a transmitter driver;
   a general compensation circuit coupled to the transmitters to generally compensate the transmitter drivers; and
   a separate specific compensation circuit coupled to each transmitter to specifically compensate the transmitter driver in the transmitter to which it is coupled, wherein the general compensation circuit is coupled to a separate bias generator for each transmitter to provide a compensation current to the bias generator, which is coupled to an associated transmitter driver to control its drive strength.

2. The chip of claim 1, in which the general compensation circuit is to compensate for PVT fluctuations.

3. The chip of claim 1, in which the general compensation circuit is a current compensation circuit.

4. The chip of claim 1, in which the general compensation circuit is coupled to each transmitter bias generator through a current mode digital to analog converter circuit associated with the transmitter.

5. The chip of claim 4, in which each specific compensation circuit is a current compensation circuit coupled to one of the current mode digital to analog converter circuits, which combines the general compensation current with the specific compensation current.

6. The chip of claim 5, in which each transmitter is to transmit a differential signal through a transmitter termination resistance bank that is compensated by a general resistive compensation circuit.

7. The chip of claim 6, in which each specific compensation circuit comprises a low offset comparator coupled to the termination resistance bank to compare a driven signal with a reference signal.

8. The chip of claim 7, in which each specific compensation circuit comprises a circuit to average a comparison result from the comparator and provide the averaged result as a digital signal to its associated current mode analog to digital converter.

9. A chip, comprising:
   a transmitter having a differential transmitter driver;
   a general compensation circuit coupled to the transmitter to generally compensate the transmitter driver; and
   a specific compensation circuit coupled to the transmitter driver to specifically compensate the transmitter driver, wherein the general compensation circuit is coupled to a bias generator coupled to the transmitter driver to control its drive strength, the general compensation circuit being coupled to the bias generator through a current mode digital to analog converter circuit to which it provides the compensation current.

10. The chip of claim 9, in which the general compensation circuit is to compensate for PVT fluctuations.

11. The chip of claim 9, in which the general compensation circuit is a current compensation circuit and provides a compensation current to the transmitter.

12. The chip of claim 9, in which the specific compensation circuit is a current compensation circuit coupled to the current mode digital to analog converter circuit to provide it with a specific compensation current, the digital to analog converter to combine the general compensation current with the specific compensation current to control the bias generator.

13. The chip of claim 12, in which the transmitter is to transmit a differential signal through a transmitter termination resistance bank that is to be compensated by a general resistive compensation circuit.

14. The chip of claim 13, in which the specific compensation circuit comprises a low offset comparator coupled to the termination resistance bank to compare a driven signal with a reference signal.

15. The chip of claim 14, in which the specific compensation circuit comprises a circuit to average a comparison result from the comparator and provide the averaged result as a digital signal to the associated current mode analog to digital converter.

16. A system, comprising:
   (a) a microprocessor having an I/O interface with a transmitter having: a differential transmitter driver; a general compensation circuit coupled to the transmitter to generally compensate the transmitter driver; and a specific compensation circuit coupled to the transmitter driver to specifically compensate the transmitter driver, wherein the general compensation circuit is coupled to the transmitter bias generator through a current mode digital to analog converter circuit;
   (b) an antenna; and
   (c) a wireless interface coupled to the microprocessor through the I/O interface and to the antenna to communicatively link the microprocessor to a wireless network.

17. The system of claim 16, in which the general compensation circuit is coupled to a bias generator coupled to the transmitter driver to control its drive strength.

* * * * *